(12) United States Patent
Luo et al.

(10) Patent No.: US 12,200,687 B2
(45) Date of Patent: Jan. 14, 2025

(54) METHOD PERFORMED BY USER EQUIPMENT, AND USER EQUIPMENT

(71) Applicant: SHARP KABUSHIKI KAISHA, Sakai (JP)

(72) Inventors: Chao Luo, Shanghai (CN); Renmao Liu, Shanghai (CN); Yinan Zhao, Shanghai (CN); Toshizo Nogami, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 368 days.

(21) Appl. No.: 17/797,052

(22) PCT Filed: Feb. 5, 2021

(86) PCT No.: PCT/CN2021/075486
§ 371 (c)(1),
(2) Date: Aug. 2, 2022

(87) PCT Pub. No.: WO2021/160033
PCT Pub. Date: Aug. 19, 2021

(65) Prior Publication Data
US 2023/0069535 A1 Mar. 2, 2023

(30) Foreign Application Priority Data
Feb. 12, 2020 (CN) .......................... 202010089530.3

(51) Int. Cl.
*H04W 56/00* (2009.01)
*H04W 72/1263* (2023.01)
*H04W 72/566* (2023.01)

(52) U.S. Cl.
CPC ..... *H04W 72/1263* (2013.01); *H04W 72/569* (2023.01)

(58) Field of Classification Search
CPC .................. H04W 72/1263; H04W 72/569
USPC ........................................................ 370/329
See application file for complete search history.

(56) References Cited

U.S. PATENT DOCUMENTS

| 2020/0205166 A1* | 6/2020 | Huang | H04W 76/27 |
| 2021/0211219 A1* | 7/2021 | Sarkis | H04L 1/0041 |
| 2022/0132471 A1* | 4/2022 | Hwang | H04W 72/20 |

OTHER PUBLICATIONS

"Jin et al.,A Data Processing Method, Device, Terminal Device And Storage Medium, May 1, 2020, CN 111093287" (Year: 2019).*
LG Electronics et al., "New WID on 5G V2X with NR sidelink", RP-190766 3GPP TSG RAN Meeting #83, Shenzhen, China, Mar. 18-21, 2019.
NTT Docomo, Inc., "New WID on New Radio Access Technology", RP-170855 3GPP TSG RAN Meeting #75, Dubrovnik, Croatia, Mar. 6-9, 2017.

(Continued)

*Primary Examiner* — Sai Ming Chan
(74) *Attorney, Agent, or Firm* — ScienBiziP, P.C.

(57) ABSTRACT

According to the present invention, a method performed by user equipment is provided. The method is characterized by including: determining N PSFCHs, and performing one or more PSFCH-related operations, wherein N is an integer greater than or equal to 2, each of the N PSFCHs is for transmission or reception and overlapped in time, and destination layer-1 identifiers in SCI for scheduling data transmission triggering the N PSFCHs are different from each other.

4 Claims, 2 Drawing Sheets

(56) References Cited

OTHER PUBLICATIONS

Huawei et al., "New WID on 3GPP V2X Phase 2", RP-170798 3GPP TSG RAN Meeting #75, Dubrovnik, Croatia, Mar. 6-9, 2017.
LG Electronics et al., "New WI proposal: Support for V2V services based on LTE sidelink", RP-152293 3GPP TSG RAN Meeting #70, Sitges, Spain, Dec. 7-10, 2015.
Samsung, "Introduction of V2X in NR", R1-1913680 3GPP TSG-RAN WG1 Meeting #99, Reno, USA, Nov. 18-22, 2019.

* cited by examiner

METHOD PERFORMED BY USER EQUIPMENT, AND USER EQUIPMENT

TECHNICAL FIELD

The present invention relates to a method performed by user equipment, and user equipment.

BACKGROUND

In 5G V2X, due to the half-duplex limitation of UE and the limitation of the number of PSFCHs that can be transmitted and/or received simultaneously, etc., how to determine PSFCH(s) to be transmitted and/or received among a plurality of triggered PSFCH(s) is a problem to be solved. Furthermore, in 5G V2X, how to determine OFDM symbols in one slot occupied by PSFCHs and/or PSSCHs is also a problem to be solved.

PRIOR ART DOCUMENTS

Non-Patent Documents

Non-Patent Document 1: RP-152293, New WI proposal: Support for V2V services based on LTE sidelink
Non-Patent Document 2. RP-170798, New WID on 3GPP V2X Phase 2
Non-Patent Document 3: RP-170855, New WID on New Radio Access Technology
Non-Patent Document 4: RP-190766, New WID on 5G V2X with NR sidelink

SUMMARY OF INVENTION

In order to address at least part of the aforementioned issues, the present invention provides a method performed by user equipment, and user equipment, whereby the UE can efficiently and unambiguously determine PSFCH(s) to be transmitted or received.

According to the present invention, a method performed by user equipment is provided. The method is characterized by comprising: in a case where $N_{TX}$ PSFCHs are triggered to be transmitted by a first SCI set, $N_{RX}$ PSFCHs are triggered to be received by a second SCI set and the $N_{TX}$ PSFCHs and the $N_{RX}$ PSFCHs are overlapped in time, if the lowest value among values in priority fields in the first SCI set and the second SCI set falls in the first SCI set, transmitting one or more of the $N_{TX}$ PSFCHs, and if the lowest value among the values in the priority fields in the first SCI set and the second SCI set falls in the second SCI set, receiving one or more of the $N_{RX}$ PSFCHs.

According to the present invention, a method performed by user equipment is provided. The method is characterized by comprising: determining two consecutive OFDM symbols occupied by a PSFCH in one slot, and transmitting the PSFCH, wherein a number of a second OFDM symbol in the two consecutive OFDM symbols is $1_2^{PSFCH} = 1_{start}^{SL} + N_{length}^{SL} - 2$, $1_{start}^{SL}$ being a starting symbol of an SL time-domain resource in the slot, and $N_{length}^{SL}$ being the number of symbols of the SL time-domain resource in the slot.

According to the present invention, a method performed by user equipment is provided. The method is characterized by comprising:
determining N PSFCHs, and performing one or more PSFCH-related operations, wherein N is an integer greater than or equal to 2, and the N PSFCHs are for transmission or reception.

Preferably, each of the N PSFCHs is for transmission or reception.

Preferably, the N PSFCHs are overlapped in time.

Preferably, destination layer-1 identifiers in SCI for scheduling data transmission triggering the N PSFCHs are different from each other.

Preferably, each of the N PSFCHs is associated with a priority respectively.

Preferably, the one or more PSFCH-related operations comprise: if a PSFCH with the highest priority among the N PSFCHs is for transmission, transmitting the PSFCH with the highest priority, and performing no transmission and/or reception operation on other PSFCHs among the N PSFCHs.

Preferably, the one or more PSFCH-related operations comprise: if a PSFCH with the highest priority among the N PSFCHs is for transmission, transmitting no more than $M_{TX,MAX}$ PSFCHs for transmission, including the PSFCH with the highest priority, wherein $M_{TX,MAX}$ is a pre-defined, pre-configured or configured value.

Preferably, the one or more PSFCH-related operations comprise: if a PSFCH with the highest priority among the N PSFCHs is for reception, receiving the PSFCH with the highest priority.

Preferably, the one or more PSFCH-related operations comprise: if a PSFCH with the highest priority among the N PSFCHs is for reception, receiving no more than $M_{RX,MAX}$ PSFCHs for reception, including the PSFCH with the highest priority.

Furthermore, according to the present invention, a method performed by user equipment is provided. The method is characterized by comprising:
determining $N_{PSFCH}$ symbols occupied by a PSFCH in one slot, and performing one or more PSFCH-related operations.

Furthermore, according to the present invention, a method performed by user equipment is provided. The method is characterized by comprising:
determining $N_{PSFCH}$ symbols occupied by a PSFCH in one slot, and performing one or more PSFCH-related operations.

Furthermore, according to the present invention, user equipment is provided, comprising: a processor; and a memory, storing instructions, wherein the instructions, when run by the processor, perform the method described above.

Therefore, the present invention provides a method, which enables the UE to efficiently and unambiguously determine a PSFCH to be transmitted or received by establishing a priority rule of transmitting and/or receiving the PSFCH.

Furthermore, the present invention provides a method, which enables the UE to efficiently and unambiguously transmit or receive a PSFCH by determining the number and/or locations of symbols of the PSFCH in a slot.

Furthermore, the present invention provides a method, which enables the UE to efficiently and unambiguously transmit or receive a PSSCH by determining the number and/or locations of symbols of the PSSCH in a slot.

BRIEF DESCRIPTION OF DRAWINGS

The above and other features of the present invention will be more apparent from the following detailed description in combination with the accompanying drawings, in which.

DETAILED DESCRIPTION OF EMBODIMENTS

Figure 1:
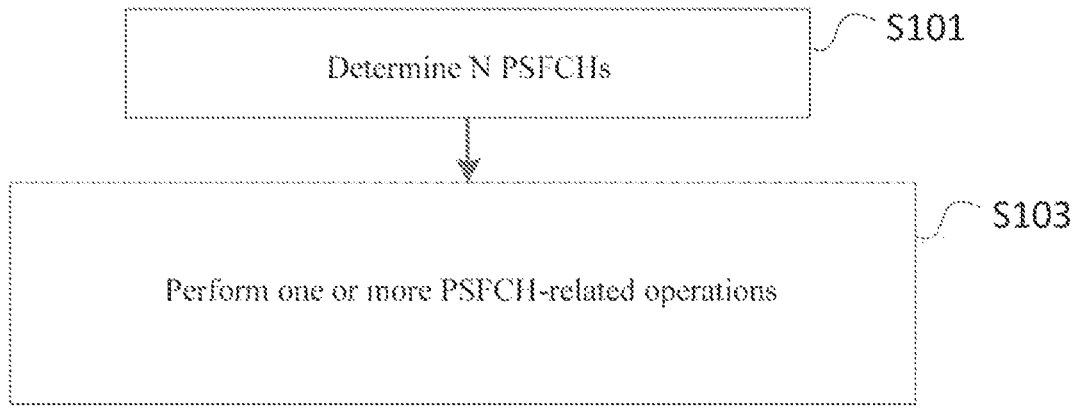
FIG. 1 is a flowchart showing a method performed by user equipment according to Embodiment 1 of the present invention.

The following describes the present invention in detail with reference to the accompanying drawings and specific embodiments. It should be noted that the present invention should not be limited to the specific embodiments described below. In addition, detailed descriptions of well-known technologies not directly related to the present invention are omitted for the sake of brevity, in order to avoid obscuring the understanding of the present invention.

In the following description, a 5G mobile communication system and its later evolved versions are used as exemplary application environments to set forth a plurality of embodiments according to the present invention in detail. However, it is to be noted that the present invention is not limited to the following implementations, but is applicable to many other wireless communication systems, such as a communication system after 5G and a 4G mobile communication system before 5G.

Some terms involved in the present invention are described below. Unless otherwise specified, the terms used in the present invention adopt the definitions herein. The terms given in the present invention may vary in LTE, LTE-Advanced, LTE-Advanced Pro, NR, and subsequent communication systems, but unified terms are used in the present invention. When applied to a specific system, the terms may be replaced with terms used in the corresponding system.

3GPP: 3rd Generation Partnership Project
AGC: Automatic Gain Control
AL: Aggregation Level
AS: Access Stratum
BWP: Bandwidth Part
CA: Carrier Aggregation
CCE: Control Channel Element
CORESET: Control Resource Set
CP: Cyclic Prefix
CP-OFDM: Cyclic Prefix Orthogonal Frequency Division Multiplexing
CRB: Common Resource Block
CRC: Cyclic Redundancy Check
CSI: Channel-State Information
CSS: Common Search Space
DC: Dual Connectivity
DCI: Downlink Control Information
DFN: Direct Frame Number
DFT-s-OFDM: Discrete Fourier Transformation Spread Orthogonal Frequency Division Multiplexing
DL: Downlink
DL-SCH: Downlink Shared Channel
DM-RS: Demodulation Reference Signal
eMBB: Enhanced Mobile Broadband, (enhanced mobile broadband communication)
eNB: E-UTRAN Node B
E-UTRAN: Evolved UMTS Terrestrial Radio Access Network
FDD: Frequency Division Duplex
FDRA: Frequency Domain Resource Assignment
FR1: Frequency Range 1
FR2: Frequency Range 2
GLONASS: Global Navigation Satellite System
gNB: NR Node B
GNSS: Global Navigation Satellite System
GPS: Global Positioning System
HARQ: Hybrid Automatic Repeat Request
ID: Identity (or Identifier)
IE: Information Element
IP: Internet Protocol
LCID: Logical Channel ID, Logical Channel Identifier
LTE: Long Term Evolution
LTE-A: Long Term Evolution-Advanced
MAC: Medium Access Control
MAC CE: MAC Control Element
MCG: Master Cell Group
MIB: Master Information Block
MIB-SL: Master Information Block-Sidelink
MIB-SL-V2X: Master Information Block-Sidelink-Vehicle to Everything
MIB-V2X: Master Information Block-Vehicle to Everything
mMTC: Massive Machine Type Communication
NAS: Non-Access Stratum
NDI: New Data Indicator
NR: New Radio
NUL: Normal Uplink
OFDM: Orthogonal Frequency Division Multiplexing
PBCH: Physical Broadcast Channel
PDCCH: Physical Downlink Control Channel
PDCP: Packet Data Convergence Protocol.
PDSCH: Physical Downlink Shared Channel
PSBCH: Physical Sidelink Broadcast Channel
PSCCH: Physical Sidelink Control Channel
PSFCH: Physical Sidelink Feedback Channel
PSSCH: Physical Sidelink Shared Channel
PRB: Physical Resource Block
PSS: Primary Synchronization Signal
PSS-SL: Primary Synchronization Signal for Sidelink
PSSS: Primary Sidelink Synchronization Signal
PTAG: Primary Timing Advance Group
PUSCH: Physical Uplink Shared Channel
PUCCH: Physical Uplink Control Channel
QCL: Quasi Co-Location
QoS: Quality of Service
QZSS: Quasi-Zenith Satellite System
RAR: Random Access Response
RB: Resource Block
RE: Resource Element
REG: Resource-Element Group
RF: Radio Frequency
RLC: Radio Link Control
RNTI: Radio Network Temporary Identifier
RRC: Radio Resource Control
RV: Redundancy Version
S-BWP: Sidelink Bandwidth Part
S-MIB: Sidelink Master Information Block
S-PSS: Sidelink Primary Synchronization Signal
S-SSB: Sidelink SS/PBCH Block (Sidelink Synchronization Signal/Physical Broadcast Channel Block)
S-SSS: Sidelink Secondary Synchronization Signal
SCG: Secondary Cell Group
SCI: Sidelink Control Information
SCS: Subcarrier Spacing
SDAP: Service Data Adaptation Protocol
SFN: System Frame Number SIB: System Information Block
SL: Sidelink
SL BWP: Sidelink Bandwidth Part
SL MIB: Sidelink Master Information Block
SL PSS: Sidelink Primary Synchronization Signal
SL SS: Sidelink Synchronization Signal
SL SSID: Sidelink Synchronization Signal Identity (or Sidelink Synchronization Signal Identifier)
SL SSB: Sidelink SS/PBCH Block (Sidelink Synchronization Signal/Physical Broadcast Channel Block)
SL SSS: Sidelink Secondary Synchronization Signal
SLSS: Sidelink Synchronization Signal
SLSS ID: Sidelink Synchronization Signal Identity (or Sidelink Synchronization Signal Identifier)
SLSSID: Sidelink Synchronization Signal Identity (or Sidelink Synchronization Signal Identifier)
SpCell: Special Cell
SRS: Sounding Reference Signal
SSB: SS/PBCH Block (Synchronization Signal/Physical Broadcast Channel Block)
SSB-SL: SS/PBCH Block for Sidelink (Sidelink Synchronization Signal/Physical Broadcast Channel Block)
SSS: Secondary Synchronization Signal
SSS-SL: Secondary Synchronization Signal for Sidelink
SL SSSB: Sidelink SS/PBCH Block (Sidelink Synchronization Signal/Physical Broadcast Channel Block)
SSSS: Secondary Sidelink Synchronization Signal
STAG: Secondary Timing Advance Group
Sub-channel: Sub-channel
SUL: Supplementary Uplink
TA: Timing Advance
TAG: Timing Advance Group
TB: Transport Block
TCP: Transmission Control Protocol
TDD: Time Division Duplex
TPC: Transmit Power Control
UE: User Equipment
UL: Uplink
UMTS: Universal Mobile Telecommunications System
URLLC: Ultra-Reliable and Low Latency Communication
USS: UE-specific Search Space
V2I: Vehicle-to-Infrastructure
V2N: Vehicle-to-Network
V2P: Vehicle-to-Pedestrian
V2V: Vehicle-to-Vehicle
V2X: Vehicle-to-Everything
VRB: Virtual Resource Block Unless otherwise specified, in all embodiments and implementations of the present invention:

Optionally, "send" may be replaced with "transmit" where applicable. Vice versa.

Optionally, "higher layer" may refer to one or more protocol layers or protocol sub-layers above a physical layer. For example, a MAC layer, an RLC layer, a PDCP layer, a PC5RRC layer, a PC5-S layer, an RRC layer, a V2X layer, an application layer, a V2X application layer, or the like.

Optionally, "pre-configuration" may be pre-configuration performed by means of a higher layer protocol/signaling. For example, it is pre-configured in a specific storage location in the UE (for example, it is pre-configured according to the specification of the high layer protocol), or a specific accessible storage location in the UE is pre-configured (for example, it is pre-configured according to the specification of the higher layer protocol).

Optionally, "configuration" may be configuration performed by means of a higher layer protocol/signaling. For example, configuration is performed for the UE by means of RRC signaling.

Optionally, a time-domain resource may also be referred to as a time resource.

Optionally, a frequency-domain resource may also be referred to as a frequency resource.

Optionally, "symbol" refers to "OFDM symbol."

Optionally, in one slot, OFDM symbol numbers may start from 0. For example, for a normal CP, a set of OFDM symbol numbers in one slot may be $\{0, 1, \ldots, 13\}$. For another example, for an extended CP, a set of OFDM symbol numbers in one slot may be $\{0, 1, \ldots, 11\}$.

Optionally, the resource block may refer to a virtual resource block (VRB), or may refer to a physical resource block (PRB), or may refer to a common resource block (CRB), or may refer to a resource block defined in other manner.

Optionally, in one resource block, subcarrier numbers may start from 0. For example, a set of subcarrier numbers in one resource block may be $\{0, 1, \ldots, 11\}$.

Optionally, $(a_1, a_2, \ldots, a_N)$ may represent an N-tuple. wherein:

If $a_1=a'_1, a_2=a'_2, \ldots, a_N=a'_N$, $(a_1, a_2, \ldots, a_N)$ is equal to (or equivalent to) $(a'_1, a'_2, \ldots, a'_N)$; otherwise, $(a_1, a_2, \ldots, a_N)$ is not equal to (or not equivalent to) $(a'_1, a'_2, \ldots, a'_N)$.

Optionally, in the presence of set $S_1$ and set $S_2$, set $S=S_1+S_2$ represents a union of set $S_1$ and set $S_2$.

Optionally, the use of GAP symbols may include conversion from reception to transmission, or from transmission to reception, etc.

In communication based on device to device (D2D) technology, an interface between devices (also referred to as user equipment (UE)) may be referred to as a PC5 interface. A corresponding transmission link on a physical layer may be referred to as a "direct link" or "sidelink" (SL for short) so as to be distinguished from an uplink (UL for short) and a downlink (DL for short).

Communication based on an SL may be referred to as sidelink (SL) communication. An SL based on LTE technology may be referred to as an LTE SL. An SL based on NR technology may be referred to as an NR SL. 5G V2X communication may be based on an LTE SL or an NR SL.

Hereinafter, "SL" refers to an NR SL unless otherwise specified.

A physical layer of an SL interface can support transmissions in one or more modes, such as broadcast transmission, groupcast transmission, unicast transmission, and the like, in one or more of in-coverage, out-of-coverage, and partial-coverage scenarios.

For frequency range 1 (FR1), a subcarrier spacing (SCS, denoted as $\Delta f$, in units of kHz) corresponding to the SL may be 15 kHz (normal CP), or 30 kHz (normal CP), or 60 kHz (normal CP or extended CP). For frequency range 2 (FR2), an SCS corresponding to the SL may be 60 kHz (normal CP or extended CP), or 120 kHz (normal CP). Each SCS corresponds to one SCS configuration (denoted as $\mu$). For example, $\Delta f=15$ kHz corresponds to $\mu=0$, $\Delta f=30$ kHz corresponds to $\mu=1$, $\Delta f=60$ kHz corresponds to $\mu=2$, $\Delta f=120$ kHz corresponds to $\mu=3$, and so on. For another example, for any given $\mu$, $\Delta f=2^{\mu} \cdot 15$ kHz. $\mu$ may be an SCS configuration of an SL carrier. For example, all SL transmissions in one SL carrier use the same SCS configuration and/or the same CP. $\mu$ may be an SCS configuration of a sidelink bandwidth part (SL BWP, or referred to as S-BWP, or referred to as SBWP, or referred to as SL-BWP, or referred to as BWP-SL, or referred to as BWP for short). For example, all SL transmissions in one SL BWP use the same SCS configuration and/or the same CP. µ may be an SCS configuration of a resource pool. For example, all SL transmissions in one resource pool use the same SCS configuration and/or the same CP.

Signals and channels related to an SL operation may include:
- an SL PSS (sidelink primary synchronization signal), or referred to as an S-PSS, or referred to as an SPSS, or referred to as an SL-PSS, or referred to as a PSS-SL, or referred to as a PSSS (primary sidelink synchronization signal), or the like;
- an SL SSS (sidelink secondary synchronization signal), or referred to as an S-SSS, or referred to as an SSSS (sidelink secondary synchronization signal), or referred to as an SL-SSS, or referred to as an SSS-SL, or referred to as an SSSS (secondary sidelink synchronization signal), or the like;
- a PSBCH (physical sidelink broadcast channel);
- a PSCCH (physical sidelink control channel);
- a PSSCH (physical sidelink shared channel); and
- a PSFCH (physical sidelink feedback channel).

The SL PSS, the SL SSS, and the PSBCH may be organized together into a block on a time/frequency resource. The block is referred to as, for example, an SL SSB (sidelink synchronization signal/PSBCH block, or SSS/PSBCH block), or is referred to as an SSS/PSBCH block, or is referred to as an S-SS/PSBCH block, or is referred to as an S-SSB, or is referred to as an SSSB, or is referred to as an SL-SSB, or is referred to as an SSB-SL. A transmission bandwidth (for example, 11 resource blocks) of the SL SSB may be located in a corresponding SL carrier (for example, located in one SL BWP configured in the SL carrier). The SL PSS and/or the SL SSS may carry an SL SSID (sidelink synchronization identity, or sidelink synchronization identifier, or sidelink synchronization signal identity, or sidelink synchronization signal identifier, or referred to as SL-SSID, or referred to as SSID-SL, or referred to as SLSSID, or referred to as SLSS ID, or referred to as S-SSID, or the like), and the PSBCH may carry an SL MIB (sidelink master information block, or referred to as SL-MIB, or referred to as S-MIB, or referred to as MIB-SL). The SL MIB may include configuration information of the SL, such as information related to a direct frame number (or referred to as a frame number) or a direct half frame number (or referred to as a half frame number) or a direct subframe number (or referred to as a subframe number) or a direct slot number (or referred to as a slot number) where a PSBCH (or a corresponding SL SSB) carrying the SL MIB is located.

On the SL, a time-domain resource and/or a frequency-domain resource used to transmit the SL SSB may be configured by means of higher layer parameter(s). For example, in the frequency domain, a location of the SL SSB in the frequency domain may be configured by means of a parameter absoluteFrequencySSB-SL. For another example, in the time domain, in a period having a length of 16 frames, the number of SL SSBs (denoted as, for example $N_{period}^{S\text{-}SSB}$) may be configured by means of a parameter numSSwithinPeriod-SL. An index of a slot where an SL SSB having a number (or index) of $i_{S\text{-}SSB}$ ($0 \leq i_{S\text{-}SSB} \leq N_{period}^{S\text{-}SSB}-1$) is located in the period having a length of 16 frames may be $N_{offset}^{S\text{-}SSB} + N_{interval}^{S\text{-}SSB} \cdot i_{S\text{-}SSB}$. $N_{offset}^{S\text{-}SSB}$ may be configured by means of a parameter timeOffsetSSB-SL, and $N_{interval}^{S\text{-}SSB}$ may be configured by means of a parameter $N_{interval}^{S\text{-}SSB}$.

Sometimes, it may be considered that the time-domain resource and/or the frequency-domain resource configured for the SL SSB in the SL carrier corresponds to a candidate SL SSB (or referred to as SL SSB candidate). On a time-domain resource and/or a frequency-domain resource corresponding to one candidate SL SSB, one or more SL SSB transmissions (for example, respectively from different UEs) may exist at the same time, or no SL SSB transmission may exist.

A synchronization source (or referred to as a synchronization reference, or referred to as a synchronization reference source) related to SL synchronization may include a GNSS (global navigation satellite system, a gNB, an eNB, and UE (for example, NR UE, or LTE UE, or NR UE or LTE UE). UE serving as a synchronization source (for example, UE transmitting the SL SSB) may be referred to as SyncRef UE.

Examples of the GNSS include a GPS (Global Positioning System), a GLONASS (Global Navigation Satellite System), a BeiDou (Beidou Navigation Satellite System), a Galileo (Galileo Navigation Satellite System), a QZSS (Quasi-Zenith Satellite System), etc.

One or more (for example, one) SL BWPs may be configured in the SL carrier. Within each SL BWP, a starting symbol of an SL time-domain resource in one slot may be configured by means of a parameter startSLsymbols (or a parameter s-StartSymbol-r16) (for example, the symbol number in one slot is denoted as $l_{start}^{SL}$), and the number of symbols of the SL time-domain resource in one slot may be configured by means of a parameter lengthSLsymbols (or a parameter sl-LengthSymbol-r16) (for example, the number of symbols is denoted as $N_{length}^{SL}$).

The symbol of the SL time-domain resource in one slot may be referred to as "SL symbol". A set of SL symbols in one slot is denoted as $$\left(l_1^{SL}, l_2^{SL}, \ldots, l_{N_{length}^{SL}}^{SL}\right),$$

and then $$l_1^{SL} = l_{start}^{SL}, l_2^{SL} = l_{start}^{SL} + 1, \ldots, l_{N_{length}^{SL}}^{SL} = l_{start}^{SL} + N_{length}^{SL} - 1.$$

For example, if $l_{start}^{SL}=7$, $N_{length}^{SL}=7$, then the set of SL symbols in one slot is {7, 8, 9, 10, 11, 12, 13}. SL transmission may be performed in a specific resource pool. One or more resource pools may be configured in one SL BWP, and in each resource pool,
- in the frequency domain, a location of a starting resource block of a starting sub-channel of the resource pool in the SL BWP may be configured by means of a parameter startRB-Subchannel (or a parameter sl-StartRB-Subchannel-r16).
- In the frequency domain, the number (denoted as $N_{subChannel}^{SL}$) of sub-channels occupied by the resource pool may be configured by means of a parameter numSubchannel (or a parameter sl-NumSubchannel-r16). The $N_{subChannel}^{SL}$ sub-channels may be consecutive in the frequency domain.
- In the frequency domain, each sub-channel may consist of one or more resource blocks, and the specific number of resource blocks (referred to as a size of the sub-channel, for example, denoted as $n_{subChannelSize}$) may be configured by means of a parameter subchannelsize (or a parameter sl-SubchannelSize-r16). The $n_{subChannelSize}$ resource blocks may be consecutive in the frequency domain.

In the frequency domain, in an order from a low frequency to a high frequency, all sub-channels in a resource pool may be respectively numbered 0, 1, . . . , $N_{subChannel}^{SL}-1$, wherein the sub-channel numbered i may be referred to as "sub-channel i" ($0 \leq i \leq N_{subChannel}^{SL}-1$).

In the time domain, one or more slots available for the resource pool (or belonging to the resource pool) and appearing periodically may be configured by means of a parameter timeresourcepool (or a parameter sl-TimeResource-r16) (for example, by means of a slot bitmap).

A size of the period may be configured by means of a parameter periodResourcePool.

Methods for allocating resources (such as time-domain resources, or frequency-domain resources, or code-domain resources) related to the SL operation may be classified as follows:

Mode 1: a base station schedules SL resources for SL transmission.

Mode 2: UE determines the SL resources for SL transmission (that is, the base station does not participate in scheduling of the SL resources). For example, UE performing an SL transmission operation autonomously determines the SL resources for the SL transmission.

The UE may schedule data transmission by means of sidelink control information (SCI). The SL operation may support "two-stage SCI." $1^{st}$-stage SCI may include information such as resource reservation and/or resource allocation, so that all UEs monitoring the SL may perform sensing with respect to a resource reservation and/or resource allocation status. $2^{nd}$-stage SCI may include other information, such as information related to HARQ feedback and the like.

Hereinafter, unless otherwise specified, when mentioned individually, "SCI" may include only the $1^{st}$-stage SCI, or may include only the $2^{nd}$-stage SCI, or may include both the $1^{st}$-stage SCI and the $2^{nd}$-stage SCI.

A format of the $1^{st}$-stage SCI may be SCI format 0-1 (or written as "SCI format 0_1"). The following are some examples of the information that can be included in the SCI format 0-1:
priority;
frequency resource assignment;
time resource assignment;
resource reservation period; and
$2^{nd}$-stage SCI format.

A format of the $2^{nd}$-stage SCI may be SCI format 0-2 (or written as "SCI format 0_2"). The following are some examples of the information that can be included in the SCI format 0-2:
a source layer-1 identifier (source layer-1 ID, or referred to as layer-1 source ID, or referred to as physical layer source ID, or referred to as source ID (when the context is clear));
a destination layer-1 identifier (destination layer-1 ID, or referred to as layer-1 destination ID, or referred to as physical layer destination ID, or referred to as destination ID (when the context is clear));
a HARQ process identifier (HARQ process ID), or a HARQ process number;
a new data indicator (NDI); and
a redundancy version (RV).

The $1^{st}$-stage SCI may be carried on a PSCCH. The $2^{nd}$-stage SCI may be multiplexed, together with data to be transmitted, on a PSSCH associated with (or scheduled by) the PSCCH. The PSCCH and the PSSCH associated therewith may be multiplexed, in a certain manner, on the time-domain resource and/or the frequency-domain resource allocated for SL transmission (for example, a sub-channel where a starting resource block of the PSCCH is located is a starting sub-channel of the PSSCH associated therewith. For another example, the starting resource block of the PSCCH is a starting resource block of the starting sub-channel of the PSSCH associated therewith). In addition, it may be considered that the $1^{st}$-stage SCI and/or the corresponding $2^{nd}$-stage SCI schedules the PSSCH (or schedules transmission of the PSSCH, or schedules transmission of a TB carried on the PSSCH).

For a particular SL transmission including a PSCCH and/or a PSSCH, a transmitter may be referred to as TX UE, and a receiver may be referred to as RX UE. If the SL transmission is a groupcast transmission, or a unicast transmission, and if HARQ feedback is enabled, the PSFCH transmitted by the RX UE may carry feedback on the PSCCH and/or PSSCH transmitted by the TX UE, wherein the feedback may be referred to as "HARQ-ACK information". In some configurations, the HARQ-ACK information may be a positive acknowledgment (ACK), or a negative acknowledgment (NACK, or NAK). In some other configurations, the HARQ-ACK information may include only NACK.

In the time domain, PSFCH resources may be configured, for example, by means of a parameter sl-PSFCH-Period-r16, to appear periodically in a resource pool (for example, configured to be one slot, or two slots, or four slots). A particular value (for example, 0) of the parameter sl-PSFCH-Period-r16 may be used to indicate that no PSFCH resource is configured in a corresponding resource pool, and/or to indicate that HARQ feedback in the corresponding resource pool is disabled. A slot related to the PSFCH period may be a "logical slot", that is, only a slot belonging to a corresponding resource pool is included. For example, if slot 0 and slot 5 in a certain frame belong to time-domain resources of a certain resource pool, and slots 1, 2, 3, and 4 do not belong to the time-domain resources of the resource pool, then sl-PSFCH-Period-r16=1 can indicate that PSFCH resources are present in the above-mentioned slots 0 and 5.

In the frequency domain, PSFCH resources may be configured to be in one RB set (for example, a set of consecutive PRBs, or a set of partially or completely inconsecutive PRBs). For example, the configuration is performed by means of a parameter si-PSFCH-RB-Set.

Embodiments of the present invention are described below with reference to the drawings.

Embodiment 1

A method performed by user equipment according to Embodiment 1 of the present invention will be described below with reference to FIG. 1.

FIG. 1 is a flowchart showing a method performed by user equipment according to Embodiment 1 of the present invention.

As shown in FIG. 1, in Embodiment 1 of the present invention, the steps performed by the user equipment (UE) include: step S101 and step S103.

Specifically, in step S101, N PSFCHs are determined. For example, the N PSFCHs may be respectively denoted as $PSFCH_1, PSFCH_2, \ldots, PSFCH_N$.

wherein:
Optionally, N is a predefined value. For example, N=1, or N=2, or N=3, or N=4, or N=5, or N=6, or N=7, or N=8, or N=9, or N=10.
Optionally, N≥1.
Optionally, N≤$N_{max}$. wherein:
Optionally, $N_{max}$ is a predefined value. For example, $N_{max}$=1, or $N_{max}$=2, or $N_{max}$=3, or $N_{max}$=4, or $N_{max}$=5, or $N_{max}$=6, or $N_{max}$=7, or $N_{max}$=8, or $N_{max}$=9, or $N_{max}$=10.
Optionally, $N_{max}$ may be configured by means of a higher layer protocol.
Optionally, $N_{max}$ may be pre-configured by means of a higher layer protocol.
Optionally, $N_{max}$ may be related to the capabilities of the UE.
Optionally, $N_{max}$ may be determined by the period of the PSFCH resources configured in the corresponding resource pool. For example, if the parameter sl-PSFCH-Period-r16 is configured as 1, then $N_{max}$=1. For another example, if the parameter sl-PSFCH-Period-r16 is configured as 2, then $N_{max}$=2. If the parameter sl-PSFCH-Period-r16 is configured as 4, then $N_{max}$=4.
Optionally, the "determining N PSFCHs" includes: determining a time-domain resource and/or a frequency-domain resource and/or a code-domain resource for each of the N PSFCHs.
Optionally, $N_{TX}$ PSFCHs among the "N PSFCHs" are for transmission, and $N_{RX}$ PSFCHs are for reception. wherein:
Optionally, $N_{TX}+N_{RX}$=N.
Optionally, one PSFCH "for transmission" may also be expressed as the UE "being about to transmit" the PSFCH. For example, the UE is triggered to transmit the PSFCH on the time-domain resource and/or frequency-domain resource and/or code-domain resource corresponding to the PSFCH, but a corresponding transmission operation has not been performed.
Optionally, one PSFCH "for reception" may also be expressed as the UE "being about to receive" the PSFCH. For example, the UE is triggered to receive the PSFCH on the time-domain resource and/or frequency-domain resource and/or code-domain resource corresponding to the PSFCH, but a corresponding reception operation has not been performed.
Optionally, $N_{PSFCHs,1}^{overlapped}$ PSFCHs among the N PSFCHs are overlapped in time. wherein:
Optionally, $2 \leq N_{PSFCHs,1}^{overlapped} \leq N$. For example, $N_{PSFCHs,1}^{overlapped}=N$.
Optionally, any two of the $N_{PSFCHs,1}^{overlapped}$ PSFCHs are overlapped in time.
Optionally, $N_{PSFCHs,2}^{overlapped}$ PSFCHs among the N PSFCHs are located in the same slot. wherein:
Optionally, $2 \leq N_{PSFCHs,2}^{overlapped} \leq N$. For example, $N_{PSFCHs,2}^{overlapped}=N$.
Optionally, each of the N PSFCHs is associated with a priority respectively.
Optionally, each of the N PSFCHs is triggered by an SL transmission respectively, or each of the N PSFCHs is associated with an SL transmission respectively, or each of the N PSFCHs provides HARQ feedback for an SL transmission respectively. For example, an SL transmission triggering $PSFCH_1$ is denoted as $SL_1$, an SL transmission triggering $PSFCH_2$ is denoted as $SL_2$, . . . , an SL transmission triggering $PSFCH_N$ is denoted as $SL_N$. Wherein, for $SL_n (1 \leq n \leq N)$, Optionally, $SL_n$ is transmitted by the UE.
Optionally, accordingly, for the UE, $PSFCH_n$ is for reception.
Optionally, $SL_n$ is received by the UE.
Optionally, accordingly, for the UE, $PSFCH_n$ is for transmission.
Optionally, $SL_n$ may contain one or more of the following:
a PSCCH (or PSCCH transmission), for example, denoted as $PSCCH_n$.
a PSSCH (or PSSCH transmission), for example, denoted as $PSSCH_n$.
wherein:
Optionally, $PSCCH_n$ is associated with $PSSCH_n$.
Optionally, $PSCCH_n$ schedules $PSSCH_n$.
Optionally, $SL_n$ carries $1^{st}$-stage SCI (for example, a corresponding SCI format is SCI format 0-1, and the $1^{st}$-stage SCI may be denoted as $SCI_n^{0-1}$ in this case) and/or $2^{nd}$-stage SCI (for example, a corresponding SCI format is SCI format 0-2, and the $2^{nd}$-stage SCI may be denoted as $SCI_n^{0-2}$ in this case). wherein:
Optionally, $SCI_n^{0-1}$ is carried by $PSCCH_n$.
Optionally, $SCI_n^{0-1}$ is carried by $PSSCH_n$.
Optionally, $SCI_n^{0-1}$ is carried by PSCCH and $PSSCH_n$ together.
Optionally, $SCI_n^{0-2}$ is carried by $PSCCH_n$.
Optionally, $SCI_n^{0-2}$ is carried by $PSSCH_n$.
Optionally, $SCI_n^{0-2}$ is carried by $PSCCH_n$ and $PSSCH_n$ together.
Optionally, $SCI_n^{0-1}$ and/or $SCI_n^{0-2}$ is associated with $PSSCH_n$.
Optionally, $SCI_n^{0-1}$ and/or $SCI_n^{0-2}$ schedules $PSSCH_n$.
Optionally, $SCI_n^{0-1}$ and/or $SCI_n^{0-2}$ is associated with $PSFCH_n$.
Optionally, $PSFCH_n$ is associated with a priority prion, wherein prion is determined by $SCI_n^{0-1}$ and/or $SCI_n^{0-2}$. For example, prion is determined by a field (for example, a field "priority") in $SCI_n^{0-1}$. wherein:
Optionally, a larger value of $prio_n$ indicates a higher priority.
Optionally, a smaller value of $prio_n$ indicates a higher priority.
Optionally, equal values of $prio_n$ indicate a same priority.
Furthermore, in step S103, one or more PSFCH-related operations are performed. wherein:
Optionally, the UE does not support simultaneous transmission and reception. For example, if the UE is about to transmit one PSFCH and about to receive another PSFCH and the two PSFCHs are overlapped in time, the UE cannot complete both the transmission operation and the reception operation.
Optionally, the UE supports transmission of at most $M_{TX,MAX}$ PSFCHs overlapped in time.
Optionally, the UE supports reception of at most $M_{RX,MAX}$ PSFCHs overlapped in time.
Optionally, the UE supports transmission or reception of at most $M_{MAX}$ PSFCHs overlapped in time.
Optionally, the UE supports transmission of at most $M_{TX,MAX}$ PSFCHs in one slot.
Optionally, the UE supports reception of at most $M_{RX,MAX}$ PSFCHs in one slot.
Optionally, the UE supports transmission or reception of at most $M_{MAX}$ PSFCHs in one slot.
Optionally, the UE supports transmission of at most $M_{TX,MAX}$ PSFCHs overlapped in time in one slot.
Optionally, the UE supports reception of at most $M_{RX,MAX}$ PSFCHs overlapped in time in one slot.

Optionally, the UE supports transmission or reception of at most $M_{MAX}$ PSFCHs overlapped in time in one slot.

Optionally, the UE supports transmission of at most $M_{TX,MAX}$ PSFCHs in one symbol.

Optionally, the UE supports reception of at most $M_{RX,MAX}$ PSFCHs in one symbol.

Optionally, the UE supports transmission or reception of at most $M_{MAX}$ PSFCHs in one symbol.

Optionally, each of the "one or more PSFCH-related operations" may be defined as "performing PSFCH operation 1 if PSFCH condition 1 is satisfied". wherein:

Optionally, "PSFCH condition 1" and/or "PSFCH operation 1" of any two (if there are two or more) of the "one or more PSFCH-related operations" may be different.

Optionally, the "PSFCH condition 1" may be any one or more of the following (in any combination of "and" or "or" when applicable):

None of the N PSFCHs are for transmission.
One of the N PSFCHs is for transmission.
A plurality of the N PSFCHs are for transmission.
$PSFCH_{top\_prio}$ is for transmission.
None of the N PSFCHs are for reception.
One of the N PSFCHs is for reception.
A plurality of the N PSFCHs are for reception.
$PSFCH_{top\_prio}$ is for reception.
The N PSFCHs are located in the same slot.
The N PSFCHs are located in the same OFDM symbol.
At least two of the N PSFCHs are overlapped in time.
Any two of the N PSFCHs are overlapped in time.
The N PSFCHs are overlapped in time.
$PSFCH_{top\_prio}$ and another PSFCH are overlapped in time.
$PSFCH_{top\_prio}$ and a plurality of other PSFCHs are overlapped in time.
$PSFCH_{top\_prio}$ and another PSFCH for transmission are overlapped in time.
$PSFCH_{top\_prio}$ and a plurality of other PSFCHs for transmission are overlapped in time.
PSFCHtop_prio and another PSFCH for reception are overlapped in time.
$PSFCH_{top\_prio}$ and a plurality of other PSFCHs for reception are overlapped in time.
$PSFCH_{top\_prio,TX}$ and another PSFCH are overlapped in time.
$PSFCH_{top\_prio,TX}$ and a plurality of other PSFCHs are overlapped in time.
$PSFCH_{top\_prio,TX}$ and another PSFCH for transmission are overlapped in time.
$PSFCH_{top\_prio,TX}$ and a plurality of other PSFCHs for transmission are overlapped in time.
$PSFCH_{top\_prio,RX}$ and another PSFCH for reception are overlapped in time.
$PSFCH_{top\_prio,RX}$ and a plurality of other PSFCHs for reception are overlapped in time.
$PSFCH_{top\_prio,RX}$ and another PSFCH are overlapped in time.
$PSFCH_{top\_prio,RX}$ and a plurality of other PSFCHs are overlapped in time.
$PSFCH_{top\_prio,RX}$ and another PSFCH for transmission are overlapped in time.
$PSFCH_{top\_prio,RX}$ and another PSFCH for reception are overlapped in time.
$PSFCH_{top\_prio,RX}$ and a plurality of other PSFCHs for reception are overlapped in time.

The priority of $PSFCH_{top\_prio,TX}$ is higher than that of $PSFCH_{top\_prio,RX}$.
The priority of $PSFCH_{top\_prio,TX}$ is equal to that of $PSFCH_{top\_prio,RX}$.
The priority of $PSFCH_{top\_prio,TX}$ is lower than that of $PSFCH_{top\_prio,RX}$.
$ID_0^{src}, ID_1^{src}, \ldots, ID_N^{src}$ are the same.
$ID_0^{dst}, ID_1^{dst}, \ldots, ID_N^{dst}$ are the same.
$(ID_0^{src}, ID_0^{dst}), (ID_1^{src}, ID_1^{dst}), \ldots, (ID_N^{src}, ID_N^{dst})$ are the same.
$(ID_0^{src}, ID_0^{dst}, cast_0), (ID_1^{src}, ID_1^{dst}, cast_1), \ldots, (ID_N^{src}, ID_N^{dst}, cast_N)$ are the same.
$(ID_0^{src}, ID_0^{dst}, ID_0^{harq}), (ID_1^{src}, ID_1^{dst}, ID_1^{harq}), \ldots (ID_N^{src}, ID_N^{dst}, ID_N^{harq})$ are the same. $(ID_0^{src}, ID_0^{dst}, cast_0, ID_0^{harq})$,
$(ID_1^{src}, ID_1^{dst}, cast_1, ID_1^{harq}), \ldots, (ID_N^{src}, ID_N^{dst}, cast_N, ID_N^{harq})$ are the same.
$ID_0^{src}, ID_1^{src}, \ldots, ID_N^{src}$ are different from each other.
$ID_0^{dst}, ID_1^{dst}, \ldots, ID_N^{dst}$ are different from each other.
$(ID_0^{src}, ID_0^{dst}), (ID_1^{src}, ID_1^{dst}), \ldots, (ID_N^{src}, ID_N^{dst})$ are different from each other.
$(ID_0^{src}, ID_0^{dst}, cast_0), (ID_1^{src}, ID_1^{dst}, cast_1), \ldots, (ID_N^{src}, ID_N^{dst}, cast_N)$ are different from each other.
$(ID_0^{src}, ID_0^{dst}, ID_0^{harq}), (ID_1^{src}, ID_1^{dst}, ID_1^{harq}), \ldots, (ID_N^{src}, ID_N^{dst}, ID_N^{harq})$ are different from each other.
$(ID_0^{src}, ID_0^{dst}, cast_0, ID_0^{harq}), (ID_1^{src}, ID_1^{dst}, cast_1, ID_1^{harq}), \ldots, (ID_N^{src}, ID_N^{dst}, cast_N, ID_N^{harq})$ are different from each other.

wherein:

Optionally, $ID_n^{src}$ is a source layer-1 identifier indicated by $SCI_n^{0-1}$ and/or $SCI_n^{0-2}$ ($1 \leq n \leq N$).

Optionally, $ID_n^{dst}$ is a destination layer-1 identifier indicated by $SCI_n^{0-1}$ and/or $SCI_n^{0-2}$ ($1 \leq n \leq N$).

Optionally, $cast_n$ is a cast type (for example, broadcast, groupcast, or unicast) indicated by $SCI_n^{0-1}$ and/or $SCI_n^{0-2}$ ($1 \leq n \leq N$).

Optionally, $ID_n^{harq}$ is a HARQ process identifier indicated by $SCI_n^{0-1}$ and/or $SCI_n^{0-2}$ ($1 \leq n \leq N$).

Optionally, $PSFCH_{top\_prio}$ is a PSFCH with the highest priority among the N PSFCHs.

Optionally, $PSFCH_{top\_prio,RX}$ is a PSFCH with the highest priority among PSFCHs (if any) for transmission in the N PSFCHs.

Optionally, $PSFCH_{top\_prio,RX}$ is a PSFCH with the highest priority among PSFCHs (if any) for reception in the N PSFCHs.

Optionally, the "PSFCH operation 1" may be any one or more of the following (in any combination of "and" or "or" when applicable):

$PSFCH_{top\_prio}$ is transmitted.
$PSFCH_{top\_prio}$ is received.
One or more PSFCHs including $PSFCH_{top\_prio}$ are transmitted.
  For example, $N_{TX}$ PSFCHs for transmission including $PSFCH_{top\_prio}$ are transmitted.
  For another example, $M_{TX}$ PSFCHs including $PSFCH_{top\_prio}$ are transmitted. wherein:

Optionally, $M_{TX} \geq 1$.
Optionally, $M_{TX} \leq M_{TX,MAX}$.
Optionally, $M_{TX} = \min(N_{TX}, M_{TX,MAX})$.
Optionally, the "$M_{TX}$ PSFCHs" are $M_{TX}$ PSFCHs with the highest priority among the $N_{TX}$ PSFCHs for transmission.

For example, N=4, $M_{TX,MAX}=2$, $PSFCH_1$, $PSFCH_2$ and $PSFCH_3$ are for transmission, and $PSFCH_4$ is for reception. The priority of $PSFCH_1$ is higher than that of $PSFCH_2$, the priority of $PSFCH_2$ is higher than that of $PSFCH_3$, and the priority of PSFCH$_3$ is higher than that of PSFCH$_4$. Then, $M_{TX}=\min(N_{TX}, M_{TX,MAX})=2$, and the "$M_{TX}$ PSFCHs" are PSFCH$_1$ and PSFCH$_2$.

For another example, at least PSFCH$_{top\_prio}$ is transmitted. Whether to transmit other PSFCHs (if any) among the $N_{TX}$ PSFCHs for transmission is by UE implementation.

One or more PSFCHs including PSFCH$_{top\_prio}$ are received.

For example, $N_{RX}$ PSFCHs for reception including PSFCH$_{top\_prio}$ are received.

For another example, $M_{RX}$ PSFCHs including PSFCH$_{top\_prio}$ are received. wherein:

Optionally, $M_{RX} \geq 1$.
Optionally, $M_{RX} \leq M_{RX,MAX}$.
Optionally, $M_{RX}=\min(N_{RX}, M_{RX,MAX})$.
Optionally, the "$M_{RX}$ PSFCHs" are $M_{RX}$ PSFCHs with the highest priority among the $N_{RX}$ PSFCHs for reception.

For example, N=4, $M_{RX,MAX}=2$, PSFCH$_1$, PSFCH$_2$ and PSFCH$_3$ are for reception, and PSFCH$_4$ is for transmission. The priority of PSFCH$_1$ is higher than that of PSFCH$_2$, the priority of PSFCH$_2$ is higher than that of PSFCH$_1$, and the priority of PSFCH$_3$ is higher than that of PSFCH$_4$. Then, $M_{RX}=\min(N_{RX}, M_{RX,MAX})=2$, and the "$M_{RX}$ PSFCHs" are PSFCH$_1$ and PSFCH$_2$.

For another example, at least PSFCH$_{top\_prio}$ is received. Whether to receive other PSFCHs (if any) among the $N_{RX}$ PSFCHs for reception is by UE implementation.

PSFCH$_{top\_prio,TX}$ is transmitted.
PSFCH$_{top\_prio,RX}$ is received.

For example, each of the following is an example of the "PSFCH-related operation":

If the UE is about to transmit a group of PSFCHs (denoted as set S$_1$) and receive a group of PSFCHs (denoted as set S$_2$), a PSFCH with the highest priority (denoted as PSFCH$_{top\_prio}$) in set S=S$_1$+S$_2$ is for transmission (i.e. PSFCH$_{top\_prio}$ belongs to set S$_1$) and any two PSFCHs in set S are overlapped in time, the UE transmits PSFCH$_{top\_prio}$ (optionally, no transmission/reception operation is performed on other PSFCHs in set S).

If the UE is about to transmit a group of PSFCHs (denoted as set S$_1$) and receive a group of PSFCHs (denoted as set S$_2$), a PSFCH with the highest priority (denoted as PSFCH$_{top\_prio}$) in set S=S$_1$+S$_2$ is for reception (i.e. PSFCH$_{top\_prio}$ belongs to set S$_2$) and any two PSFCHs in set S are overlapped in time, the UE receives PSFCH$_{top\_prio}$ (optionally, no transmission/reception operation is performed on other PSFCHs in set S).

If the UE is about to transmit a group of PSFCHs (denoted as set S$_1$) and receive a group of PSFCHs (denoted as set S$_2$), a PSFCH with the highest priority (denoted as PSFCH$_{top\_prio}$) in set S=S$_1$+S$_2$ is for reception (i.e. PSFCH$_{top\_prio}$ belongs to set S$_2$) and any two PSFCHs in set S are overlapped in time, the UE receives no more than $M_{RX,MAX}$ PSFCHs including PSFCH$_{top\_prio}$ in set S$_2$ (optionally, no transmission/reception operation is performed on other PSFCHs in set S).

If the UE is about to transmit a group of PSFCHs (denoted as set S$_1$) and receive a group of PSFCHs (denoted as set S$_2$), a PSFCH with the highest priority (denoted as PSFCH$_{top\_prio}$) in set S=S$_1$=S$_2$ is for reception (i.e. PSFCH$_{top\_prio}$ belongs to set S$_2$) and any two PSFCHs in set S are overlapped in time, the UE receives all PSFCHs in set S$_2$ (optionally, no transmission/reception operation is performed on other PSFCHs in set S).

If the UE is about to transmit a group of PSFCHs (denoted as set S) and any two PSFCHs in set S$_1$ are overlapped in time, then the UE transmits a PSFCH with the highest priority in set S$_1$ (optionally, no transmission/reception operation is performed on other PSFCHs in set S).

wherein:

"Any two PSFCHs are overlapped in time" may be replaced by "all PSFCHs are overlapped in time".

Optionally, in Embodiment 1 of the present invention, "plurality" refers to more than one.

Optionally, in Embodiment 1 of the present invention, "overlapped in time" refers to overlapped on one or more OFDM symbols.

Optionally, in Embodiment 1 of the present invention, "overlapped in time" refers to overlapped on one or more slots.

Optionally, in Embodiment 1 of the present invention, if a priority prio$_i$ associated with PSFCH$_i$ is equal to a priority prio$_j$ associated with PSFCH ($1 \leq i \leq N$, $1 \leq j \leq N$, $i \neq j$), then which of PSFCH$_i$ and PSFCH$_j$ has a higher priority may be determined in one of the following ways, or in a combination of more than one of the following ways (where applicable), or in other ways:

which of PSFCH$_i$ and PSFCH$_j$ has a higher priority is randomly determined, wherein random numbers and/or pseudo-random numbers are generated in a predefined, configured or pre-configured manner (for example, uniform distribution);

transmission is prioritized;

reception is prioritized; and the determination is by UE implementation.

For example, if there are two PSFCHs with the highest priority among the N PSFCHs in which one PSFCH is for transmission and the other PSFCH is for reception, the PSFCH for transmission in the two PSFCHs is selected as PSFCH$_{top\_prio}$. For another example, if there are three PSFCHs with the highest priority among the N PSFCHs in which two PSFCHs are for transmission and the other PSFCH is for reception, one of the two PSFCHs for transmission is randomly selected as PSFCH$_{top\_prio}$. For another example, if there are two PSFCHs with the highest priority among the N PSFCHs in which one PSFCH is for transmission and the other PSFCH is for reception, the PSFCH for reception in the two PSFCHs is selected as PSFCH$_{top\_prio}$. For another example, if there are three PSFCHs with the highest priority among the N PSFCHs in which one PSFCH is for transmission and the other two PSFCHs are for reception, one of the two PSFCHs for reception is randomly selected as PSFCH$_{top\_prio}$. For another example, if the pre-configuration or configuration is to prioritize transmission and there are two PSFCHs with the highest priority among the N PSFCHs in which one PSFCH is for transmission and the other PSFCH is for reception, the PSFCH for transmission in the two PSFCHs is selected as PSFCH$_{top\_prio}$. For another example, if the pre-configuration or configuration is to prioritize transmission and there are three PSFCHs with the highest priority among the N PSFCHs in which two PSFCHs are for transmission and the other PSFCH is for reception, one of the two PSFCHs for transmission is randomly selected as PSFCH$_{top\_prio}$. For another example, if the pre-configuration or configuration is to prioritize reception and there are two PSFCHs with the highest priority among the N PSFCHs in which one PSFCH is for transmission and the other PSFCH is for reception, the PSFCH for reception in the two PSFCHs is selected as PSFCH$_{top\_prio}$. For another example, if the pre-configuration or configuration is to prioritize reception and there are three PSFCHs with the highest priority among the N PSFCHs in which one PSFCH is for transmission and the other two PSFCHs are for reception, one of the two PSFCHs for reception is randomly selected as $PSFCH_{top\_prio}$.

Optionally, in Embodiment 1 of the present invention, $M_{TX,MAX}$ is a predefined value (for example, $M_{TX,MAX}=1$, or $M_{TX,MAX}=2$, or $M_{TX,MAX}=3$, or $M_{TX,MAX}=4$, or $M_{TX,MAX}=5$, or $M_{TX,MAX}=6$, or $M_{TX,MAX}=7$, or $M_{TX,MAX}=8$, or $M_{TX,MAX}=9$, or $M_{TX,MAX}=10$), or may be configured by means of a higher layer protocol, or may be pre-configured by means of a higher layer protocol.

Optionally, in Embodiment 1 of the present invention, $M_{RX,MAX}$ is a predefined value (for example, $M_{RX,MAX}=1$, or $M_{RX,MAX}=2$, or $M_{RX,MAX}=3$, or $M_{RX,MAX}=4$, or $M_{RX,MAX}=5$, or $M_{RX,MAX}=6$, or $M_{RX,MAX}=7$, or $M_{RX,MAX}=8$, or $M_{RX,MAX}=9$, or $M_{RX,MAX}=10$), or may be configured by means of a higher layer protocol, or may be pre-configured by means of a higher layer protocol.

Optionally, in Embodiment 1 of the present invention, $M_{MAX}$ is a predefined value (for example, $M_{MAX}=1$, or $M_{MAX}=2$, or $M_{MAX}=3$, or $M_{MAX}=4$, or $M_{MAX}=5$, or $M_{MAX}=6$, or $M_{MAX}=7$, or $M_{MAX}=8$, or $M_{MAX}=9$, or $M_{MAX}=10$), or may be configured by means of a higher layer protocol, or may be pre-configured by means of a higher layer protocol.

Thus, according to Embodiment 1, the present invention provides a method, which enables the UE to efficiently and unambiguously determine a PSFCH to be transmitted or received by establishing a priority rule of transmitting and/or receiving the PSFCH.

Embodiment 2

A method performed by user equipment according to Embodiment 2 of the present invention will be described below with reference to FIG. 2.

Figure 2:
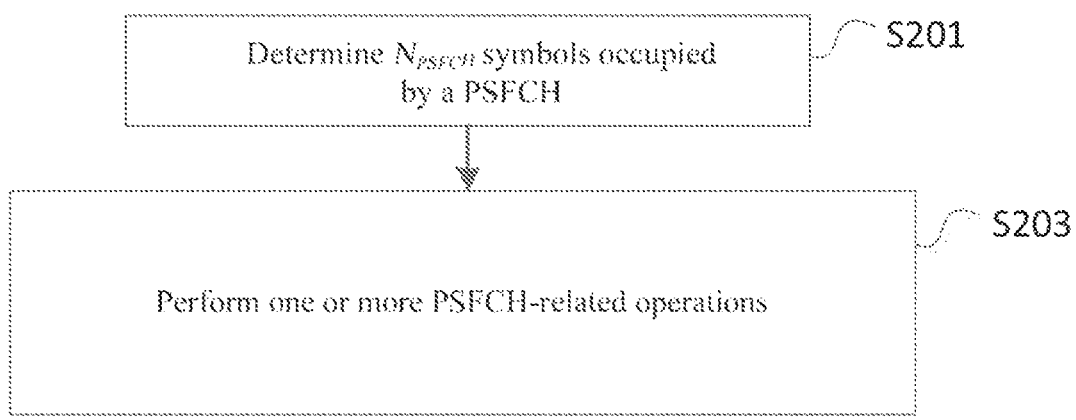
FIG. 2 is a flowchart showing a method performed by user equipment according to Embodiment 2 of the present invention.

FIG. 2 is a flowchart showing a method performed by user equipment according to Embodiment 2 of the present invention.

As shown in FIG. 2, in Embodiment 2 of the present invention, steps performed by the user equipment (UE) include: step S201 and step S203.

Specifically, in step S201, $N_{PSFCH}$ symbols occupied by a PSFCH in one slot are determined. For example, numbers of the $N_{PSFCH}$ symbols in the slot may be respectively denoted, in chronological order, as $1_1^{PSFCH}$, $1_2^{PSFCH}$, ..., $1_{N_{PSFCH}}^{PSFCH}$.

wherein:

Optionally, the $N_{PSFCH}$ symbols are consecutive symbols in the slot. In this case, symbol number of one of the $N_{PSFCH}$ symbols may be used to determine symbol numbers of other $NP_{PSFCH}-1$ symbols. For example, if $N_{PSFCH}=2$, and the second symbol in the $N_{PSFCH}$ symbols is symbol 13 (i.e. $1_2^{PSFCH}=13$), then the first symbol is symbol 12 (i.e. $1_1^{PSFCH}=12$).

Optionally, the value of $N_{PSFCH}$ is related to a format of the PSFCH. For example, for PSFCH format 0, $N_{PSFCH}=1$.

Optionally, $N_{PSFCH}$ is a predefined value. For example, $N_{PSFCH}=1$, or $N_{PSFCH}=2$, or $N_{PSFCH}=3$, or $N_{PSFCH}=4$, or $N_{PSFCH}=5$, or $N_{PSFCH}=6$, or $N_{PSFCH}=7$, or $N_{PSFCH}=8$, or $N_{PSFCH}=9$, or $N_{PSFCH}=10$, or $N_{PSFCH}=11$, or $N_{PSFCH}=12$, or $N_{PSFCH}=13$, or $N_{PSFCH}=14$.

Optionally, $N_{PSFCH}$ may be pre-configured by means of a higher layer protocol.

Optionally, $N_{PSFCH}$ may be configured by means of a higher layer protocol.

Optionally, $N_{PSFCH} \geq 1$.

Optionally, $N_{PSFCH} \leq N_{PSFCH,max}$. wherein:

Optionally, $N_{PSFCH,max}$ is a predefined value. For example, $N_{PSFCH,max}=1$, or $N_{PSFCH,max}=2$, or $N_{PSFCH,max}=3$, or $N_{PSFCH,max}=4$, or $N_{PSFCH,max}=5$, or $N_{PSFCH,max}=6$, or $N_{PSFCH,max}=7$, or $N_{PSFCH,max}=8$, or $N_{PSFCH,max}=9$, or $N_{PSFCH,max}=10$, or $N_{PSFCH,max}=11$, or $N_{PSFCH,max}=12$, or $N_{PSFCH,max}=13$, or $N_{PSFCH,max}=14$.

Optionally, $N_{PSFCH,max}$ may be configured by means of a higher layer protocol.

Optionally, $N_{PSFCH,max}$ may be pre-configured by means of a higher layer protocol.

Optionally, $N_{PSFCH,max}$ is a time-domain size of a "PSFCH region". Wherein, the PSFCH region is a frequency and/or time resource configured and/or reserved for PSFCHs in the slot, and PSFCH transmission in time slot (for example, transmission using PSFCH format 0, occupying one symbol; for example, transmission using another PSFCH format, occupying two symbols) is always located in the PSFCH region. Optionally, the PSFCH region is always located on (or in) the last few consecutive symbols of the slot.

Optionally, the $N_{PSFCH}$ symbols include symbol(s) for AGC. Wherein, examples of symbol(s) for AGC may be a symbol preceding symbol $1_1^{PSFCH}$, i.e. symbol $1_1^{PSFCH}-1$.

Optionally, the $N_{PSFCH}$ symbols do not include symbol(s) for AGC. Wherein, examples of symbol(s) for AGC may be a symbol preceding symbol $1_1^{PSFCH}$, i.e. symbol $1_1^{PSFCH}-1$.

Optionally, the $N_{PSFCH}$ symbols include symbol(s) for GAP. Wherein, examples of symbol(s) for GAP may be a symbol following symbol $1_{N_{PSFCH}}^{PSFCH}$, i.e. symbol $1_{N_{PSFCH}}^{PSFCH}+1$ Optionally, the $N_{PSFCH}$ symbols do not include symbol(s) for GAP. Wherein, examples of symbol(s) for GAP may be a symbol following symbol $1_{N_{PSFCH}}^{PSFCH}$, i.e. symbol $1_{N_{PSFCH}}^{PSFCH}+1$ Optionally, symbol numbers of one or more of the $N_{PSFCH}$ symbols (i.e. values of one or more of $1_1^{PSFCH}$, $1_2^{PSFCH}$, ..., $1_{N_{PSFCH}}^{PSFCH}$) are related to an SL time-domain resource configuration (for example, an SL time-domain resource configuration of a corresponding SL BWP). wherein:

Optionally, each of the $N_{PSFCH}$ symbols belongs to the SL symbol set $$\{l_1^{SL}, l_2^{SL}, \ldots, l_{N_{length}^{SL}}^{SL}\}$$

in the slot.

Optionally, $$l_i^{PSFCH} = l_{N_{length}^{SL}}^{SL} - 1 - (N_{PSFCH} - i),$$

wherein $i=1, 2, \ldots, N_{PSFCH}$. For example, $$l_1^{PSFCH} = l_{N_{length}^{SL}}^{SL} - N_{PSFCH}.$$

For another example, $$l^{PSFCH}_{N_{PSFCH}} = l^{SL}_{N^{SL}_{length}} - 1.$$

Optionally, $$l^{PSFCH}_i = l^{SL}_{N^{SL}_{length}} - (N_{PSFCH} - i),$$

wherein i=1, 2, ..., $N_{PSFCH}$. For example, $$l^{PSFCH}_1 = l^{SL}_{N^{SL}_{length}} - (N_{PSFCH} - 1).$$

For another example, $$l^{PSFCH}_{N_{PSFCH}} = l^{SL}_{N^{SL}_{length}}.$$

Optionally, if the last SL symbol (i.e. symbol $$l^{SL}_{N^{SL}_{length}}$$

of the slot is the last symbol of the slot (for example, for a normal CP, $$l^{SL}_{N^{SL}_{length}} = 13;$$

for another example, for an extended CP, $$l^{SL}_{N^{SL}_{length}} = 11),$$

then $$l^{PSFCH}_i = l^{SL}_{N^{SL}_{length}} - 1 - (N_{PSFCH} - i),$$

wherein i=1, 2, ..., $N_{PSFCH}$. For example, $$l^{PSFCH}_1 = l^{SL}_{N^{SL}_{length}} - N_{PSFCH}.$$

For another example, $$l^{PSFCH}_{N_{PSFCH}} = l^{SL}_{N^{SL}_{length}} - 1.$$

Optionally, if the last SL symbol (i.e. symbol $$l^{SL}_{N^{SL}_{length}})$$

of the slot is the last symbol of the slot (for example, for a normal CP, $$l^{SL}_{N^{SL}_{length}} = 13;$$

for another example, for an extended CP, $$l^{SL}_{N^{SL}_{length}} = 11),$$

then $$l^{PSFCH}_{N_{PSFCH}} = l^{SL}_{N^{SL}_{length}} - 1$$

(i.e. symbol $l_{N_{PSFCH}}^{PSFCH}$ is the last but one SL symbol of the slot). In this case, symbol $l_{N_{PSFCH}}^{PSFCH}$ is also the last but one symbol of the slot. For example, for a normal CP, $l_{N_{PSFCH}}^{PSFCH}=12$. For another example, for an extended CP, $l_{N_{PSFCH}}^{PSFCH}=10$.

Optionally, if the last SL symbol (i.e. symbol $$l^{SL}_{N^{SL}_{length}}$$

of the slot is the last symbol of the slot (for example, for a normal CP, $$l^{SL}_{N^{SL}_{length}} < 13;$$

for another example, for an extended CP, $$l^{SL}_{N^{SL}_{length}} < 11),$$

then $$l^{PSFCH}_i = l^{SL}_{N^{SL}_{length}} - (N_{PSFCH} - i).$$

For example, $$l^{PSFCH}_1 = l^{SL}_{N^{SL}_{length}} - (N_{PSFCH} - 1).$$

For another example, $$l^{PSFCH}_{N_{PSFCH}} = l^{SL}_{N^{SL}_{length}}.$$

Optionally, if the last SL symbol (i.e. symbol $$l^{SL}_{N^{SL}_{length}}$$

of the slot is the last symbol of the slot (for example, for a normal CP, $$l^{SL}_{N^{SL}_{length}} < 13;$$

for another example, for an extended CP, $$l^{SL}_{N^{SL}_{length}} < 11),$$

then $$l^{PSFCH}_{N_{PSFCH}} = l^{SL}_{N^{SL}_{length}}$$

(i.e. symbol $1_{N_{PSFCH}}^{PSFCH}$ is the last SL symbol of the slot).

Optionally, if the last SL symbol (i.e. symbol $$l^{SL}_{N^{SL}_{length}}$$

of the slot is not the last symbol of the slot (for example, for a normal CP, $$l^{SL}_{N^{SL}_{length}} = 13;$$

for another example, for an extended CP, $$l^{SL}_{N^{SL}_{length}} = 11),$$

then $$l^{PSFCH}_{i} = l^{SL}_{N^{SL}_{length}} - 1 - (N_{PSFCH} - i),$$

wherein i=1, 2, ..., $N_{PSFCH}$. For example, $$l^{PSFCH}_{N_{PSFCH}} = l^{SL}_{N^{SL}_{length}} - 1.$$

For another example, $$l^{PSFCH}_{1} = l^{SL}_{N^{SL}_{length}} - N_{PSFCH}.$$

Optionally, if the last SL symbol (i.e. symbol $$l^{SL}_{N^{SL}_{length}}$$

of the slot is not the last symbol of the slot (for example for a normal CP, $$l^{SL}_{N^{SL}_{length}} = 13;$$

for another example, for an extended CP, $$l^{SL}_{N^{SL}_{length}} = 11),$$

then $$l^{PSFCH}_{N_{PSFCH}} = l^{SL}_{N^{SL}_{length}} - 1$$

(i.e. symbol $1_{N_{PSFCH}}^{PSFCH}$ is the second to last SL symbol of the slot). In this case, symbol $1_{N_{PSFCH}}^{PSFCH}$ is also the last but one symbol of the slot. For example, for a normal CP, $1_{N_{PSFCH}}^{PSFCH}=12$. For another example, for an extended CP, $1_{N_{PSFCH}}^{PSFCH}=10$.

Optionally, if the last SL symbol (i.e. symbol $$l^{SL}_{N^{SL}_{length}}$$

of the slot is not the last symbol of the slot (for example, for a normal CP, $$l^{SL}_{N^{SL}_{length}} < 13;$$

for another example, for an extended CP, $$l^{SL}_{N^{SL}_{length}} < 11),$$

then $$l^{PSFCH}_{i} = l^{SL}_{N^{SL}_{length}} - (N_{PSFCH} - i).$$

For example, $$l^{PSFCH}_{1} = l^{SL}_{N^{SL}_{length}} - (N_{PSFCH} - 1).$$

For another example, $$l^{PSFCH}_{N_{PSFCH}} = l^{SL}_{N^{SL}_{length}}.$$

Optionally, if the last SL symbol (i.e. symbol $l_{N_{length}^{SL}}^{SL}$ of the slot is not the last symbol of the slot (for example, for a normal CP, $l_{N_{length}^{SL}}^{SL} < 13;$ for another example, for an extended CP, $l_{N_{length}^{SL}}^{SL} < 11$), then $l_{N_{PSFCH}}^{PSFCH} = l_{N_{length}^{SL}}^{SL}$ (i.e. symbol $1_{N_{PSFCH}}^{PSFCH}$ is the last SL symbol of the slot).

Furthermore, in step S103, one or more PSFCH-related operations are performed. For example, the PSFCH is transmitted. For another example, the PSFCH is received.

Thus, according to Embodiment 2, the present invention provides a method, which enables the UE to efficiently and unambiguously transmit or receive a PSFCH by determining the number and/or locations of symbols of symbols of the PSFCH in a slot.

Embodiment 3

A method performed by user equipment according to Embodiment 3 of the present invention will be described below with reference to FIG. 3.

Figure 3:
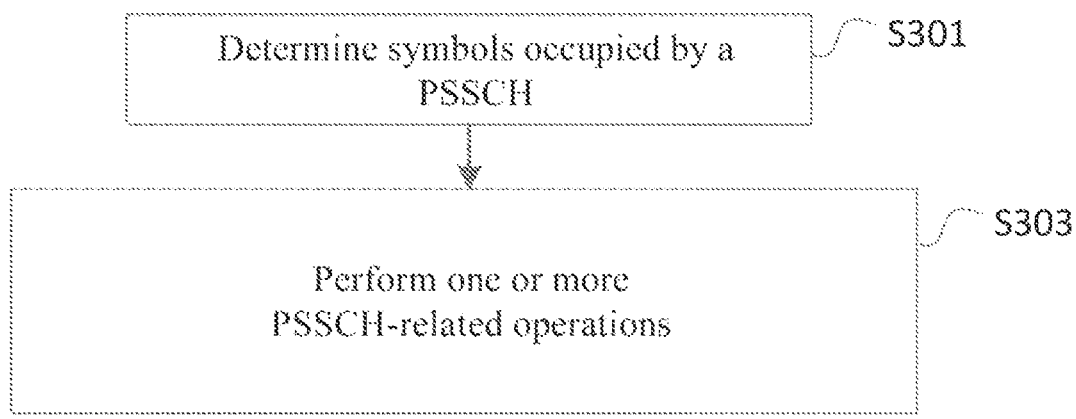
FIG. 3 is a flowchart showing a method performed by user equipment according to Embodiment 3 of the present invention.

FIG. 3 is a flowchart showing a method performed by user equipment according to Embodiment 3 of the present invention.

As shown in FIG. 3, in Embodiment 3 of the present invention, steps performed by the user equipment (UE) include: step S301 and step S303.

Specifically, in step S301, $N_{PSSCH}$ symbols occupied by a PSSCH in one slot are determined. For example, numbers of the $N_{PSSCH}$ symbols in the slot may be respectively denoted, in chronological order, as $1_1^{PSSCH}, 1_2^{PSSCH}, \ldots, 1_{N_{PSSCH}}^{PSSCH}$, wherein:

Optionally, the $N_{PSSCH}$ symbols are consecutive symbols in the slot. In this case, symbol number of one of the $N_{PSSCH}$ symbols may be used to determined symbol numbers of other $N_{PSSCH}-1$ symbols. For example, if $N_{PSSCH}=4$, and the first symbol in the $N_{PSSCH}$ symbols is symbol 3 (i.e. $1_1^{PSSCH}=3$), then the second symbol is symbol 4 (i.e. $1_2^{PSSCH}=4$), the third symbol is symbol 5 (i.e. $1_3^{PSSCH}=5$), and the fourth symbol is symbol 6 (i.e. $1_4^{PSSCH}=6$).

Optionally, the $N_{PSSCH}$ symbols include symbol(s) for AGC. Wherein, examples of symbol(s) for AGC may be a symbol preceding symbol $1_1^{PSSCH}$, i.e. symbol $1_1^{PSSCH}-1$.

Optionally, the $N_{PSSCH}$ symbols do not include symbol(s) for AGC. Wherein, examples of symbol(s) for AGC may be a symbol preceding symbol $1_1^{PSSCH}$, i.e. symbol $1_1^{PSSCH}-1$.

Optionally, the $N_{PSSCH}$ symbols include symbol(s) for GAP. Wherein, examples of symbol(s) for GAP may be a symbol following symbol $1_{N_{PSSCH}}^{PSSCH}$, i.e. symbol $1_{N_{PSSCH}}^{PSSCH}+1$.

Optionally, the $N_{PSSCH}$ symbols do not include symbol(s) for GAP. Wherein, examples of symbol(s) for GAP may be a symbol following symbol $1_{N_{PSSCH}}^{PSSCH}$, i.e. symbol $1_{N_{PSSCH}}^{PSSCH}+1$.

Optionally, each of the $N_{PSSCH}$ symbols belongs to the SL symbol set $\{l_1^{SL}, l_2^{SL}, \ldots, l_{N_{length}^{SL}}^{SL}\}.$ in the slot.

Optionally, $1_1^{PSSCH}=1_{start}^{SL}+O_{PSSCH}$, wherein $O_{PSSCH}$ may be a predefined value, or may be a pre-configured value, or may be a configured value. For example, $O_{PSSCH}=1$, i.e. $1_1^{PSSCH}=1_{start}^{SL}+1$.

Optionally, none of the $N_{PSSCH}$ symbols is located in a symbol set $S_{excluded}^{PSSCH}$ in the slot. In other words, PSSCHs should not be transmitted on (or in) symbols in the symbol set $S_{excluded}^{PSSCH}$. Wherein, the symbol set $S_{excluded}^{PSSCH}$ may contain symbols in the slot determined according to any one or more of the following (it is assumed that the number of symbols for PSFCHs in the slot is denoted as $N_{PSFCH}$, wherein symbol numbers of all the symbols are respectively denoted, in chronological order, as $1_1^{PSFCH}, 1_2^{PSFCH}, \ldots, 1_{N_{PSFCH}}^{PSFCH}$; the number of symbols for a PSFCH region is denoted as $N_{PSFCH\_region}$, wherein numbers of all the symbols are respectively denoted, in chronological order, as $1_1^{PSFCH\_region}, 1_2^{PSFCH\_region}, \ldots, 1_{N_{PSFCH\_region}}^{PSFCH\_region}$)

symbols not configured as SL symbols (i.e. symbols not belonging to the SL symbol set $\{l_1^{SL}, l_2^{SL}, \ldots, l_{N_{length}^{SL}}^{SL}\}$);

symbols for PSFCHs (if the slot is configured with PSFCHs), i.e. symbols $1_1^{PSFCH}, 1_2^{PSFCH}, \ldots, 1_{N_{PSFCH}}^{PSFCH}$;

one or more symbols following symbols for PSFCHs (or following the last symbol for PSFCHs) (if the slot is configured with PSFCHs), for example, all symbols with numbers greater than $1_{N_{PSFCH}}^{PSFCH}$ (if present);

all symbols starting from the first symbol for PSFCHs (if the slot is configured with PSFCHs), for example, all symbols with numbers greater than or equal to $1_1^{PSFCH}$;

symbols for a PSFCH region (if the slot is configured with a PSFCH region), i.e. symbols $1_1^{PSFCH\_region}, 1_2^{PSFCH\_region}, \ldots, 1_{N_{PSFCH\_region}}^{PSFCH\_region}$;

one or more symbols following symbols for a PSFCH region (or following the last symbol for a PSFCH region) (if the slot is configured with a PSFCH region), for example, all symbols with numbers greater than $1_{N_{PSFCH\_region}}^{PSFCH\_region}$ (if present);

all symbols starting from the first symbol for a PSFCH region (if the slot is configured with a PSFCH region), for example, all symbols with numbers greater than or equal to $1_1^{PSFCH\_region}$.

the last SL symbol, i.e. symbol $$l^{SL}_{N^{SL}_{length}};$$

the last SL symbol, i.e. symbol $$l^{SL}_{N^{SL}_{length}}$$

(if the slot is not configured with PSFCHs);
the last SL symbol, i.e. symbol $$l^{SL}_{N^{SL}_{length}}$$

(if the slot is configured with PSFCHs);
the last SL symbol, i.e. symbol $$l^{SL}_{N^{SL}_{length}}$$

(if symbol $$l^{SL}_{N^{SL}_{length}}$$

is the last symbol of the slot);
the last SL symbol, i.e. symbol $$l^{SL}_{N^{SL}_{length}}$$

(if symbol $$l^{SL}_{N^{SL}_{length}}$$

is not the last symbol of the slot);
the last SL symbol, i.e. symbol $$l^{SL}_{N^{SL}_{length}}$$

(if the slot is not configured with PSFCHs and symbol $$l^{SL}_{N^{SL}_{length}}$$

is not the last symbol of the slot);
the last SL symbol, i.e. symbol $$l^{SL}_{N^{SL}_{length}}$$

(if the slot is not configured with PSFCHs and symbol $$l^{SL}_{N^{SL}_{length}}$$

is the last symbol of the slot);
the last SL symbol, i.e. symbol $$l^{SL}_{N^{SL}_{length}}$$

(if the slot is configured with PSFCHs and symbol $$l^{SL}_{N^{SL}_{length}}$$

is not the last symbol of the slot);
the last SL symbol, i.e. symbol $$l^{SL}_{N^{SL}_{length}}$$

(if the slot is configured with PSFCHs and symbol $$l^{SL}_{N^{SL}_{length}}$$

is the last symbol of the slot);
a symbol preceding the first symbol for PSFCHs (if the slot is already configured with PSFCHs), i.e. symbol $l_1^{PSFCH}-1$;

two symbols preceding the first symbol for PSFCHs (if the slot is already configured with PSFCHs), i.e. symbol $l_1^{PSFCH}-1$ and symbol $l_1^{PSFCH}-2$;

three symbols preceding the first symbol for PSFCHs (if the slot is already configured with PSFCHs), i.e. symbol $l_1^{PSFCH}-1$, symbol $l_1^{PSFCH}-2$ and symbol $l_1^{PSFCH}-3$; and four symbols preceding the first symbol for PSFCHs (if the slot is already configured with PSFCHs), i.e. symbol $l_1^{PSFCH}-1$, symbol $l_1^{PSFCH}-2$, symbol $l_1^{PSFCH}-3$, and symbol $l_1^{PSFCH}-4$.

Furthermore, in step S303, one or more PSSCH-related operations are performed. For example, the PSSCH is transmitted. For another example, the PSSCH is received.

Optionally, in Embodiment 3 of the present invention, the PSFCH region is a frequency and/or time resource configured and/or reserved for PSFCHs in the slot. wherein:

Optionally, the PSFCH transmission in the slot is always located in the PSFCH region. For example, a size of the PSFCH region is two symbols. Transmission may be performed using PSFCH format 0 in the PSFCH region, occupying one symbol, or transmission may be performed using another PSFCH format, occupying two symbols.

Optionally, the PSFCH region is always located on (or in) the last consecutive symbols of the slot.

The definition of the PSFCH region is such that even if the UE does not support one or more PSFCH formats transmitted in the slot (and thus does not know the corresponding number of symbols for PSFCHs), one or more symbols that are related to the PSFCH transmission and need to be excluded in the slot can be determined when determining symbols occupied by PSSCHs. Thus, according to Embodiment 3, the present invention provides a method, which enables the UE to efficiently and unambiguously transmit or receive a PSSCH by determining the number and/or locations of symbols of the PSSCH in a slot.

Variation Embodiment

Figure 4:
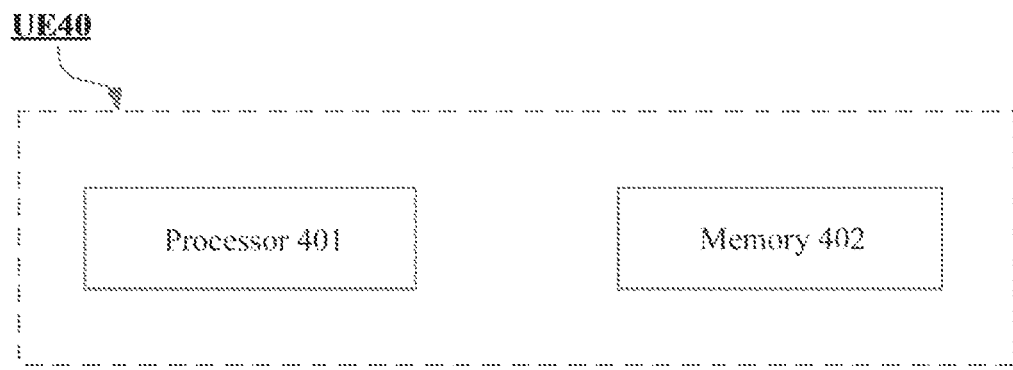
FIG. 4 is a block diagram showing the user equipment (UE) according to the present invention.

Hereinafter, FIG. 4 is used to illustrate user equipment that can perform the method performed by user equipment described in detail above in the present invention as a variant embodiment. FIG. 4 is a block diagram showing the user equipment (UE) involved in the present invention.

As shown in FIG. 4, the user equipment (UE) 40 includes a processor 401 and a memory 402. The processor 401 may include, for example, a microprocessor, a microcontroller, an embedded processor, and the like. The memory 402 may include, for example, a volatile memory (such as a random access memory (RAM)), a hard disk drive (HDD), a non-volatile memory (such as a flash memory), or other memories. The memory 402 stores program instructions. The instructions, when run by the processor 401, can perform the above method performed by user equipment as described in detail in the present invention.

The methods and related equipment according to the present invention have been described above in combination with preferred embodiments. It should be understood by those skilled in the art that the methods shown above are only exemplary, and the above embodiments can be combined with one another as long as no contradiction arises. The methods of the present invention are not limited to the steps or sequences illustrated above. The network node and user equipment illustrated above may include more modules. For example, the network node and user equipment may further include modules that can be developed or will be developed in the future to be applied to a base station, an MME, or UE, and the like. Various identifiers shown above are only exemplary, and are not meant to limit the present invention. The present invention is not limited to specific information elements serving as examples of these identifiers. A person skilled in the art could make various alterations and modifications according to the teachings of the illustrated embodiments. Those skilled in the art should understand that part of or all of the mathematical expressions, mathematical equations or mathematical inequalities may be simplified (for example, incorporating constant terms) or transformed or rewritten to some extent. Mathematical expressions, mathematical equations or mathematical inequalities before and after the simplification or transformation or rewriting may be considered to be equivalent to each other.

It should be understood that the above-described embodiments of the present invention may be implemented by software, hardware, or a combination of software and hardware. For example, various components inside the base station and the user equipment in the above embodiments may be implemented through various devices, which include, but are not limited to, analog circuit devices, digital circuit devices, digital signal processing (DSP) circuits, programmable processors, application specific integrated circuits (ASICs), field programmable gate arrays (FPGAs), programmable logic devices (CPLDs), and the like.

In this application, the term "base station" may refer to a mobile communication data and control switching center having specific transmission power and a specific coverage area and including functions such as resource allocation and scheduling, data reception and transmission, and the like.

"User equipment" may refer to a user mobile terminal, for example, including terminal devices that can communicate with a base station or a micro base station wirelessly, such as a mobile phone, a laptop computer, and the like.

In addition, the embodiments of the present invention disclosed herein may be implemented on a computer program product. More specifically, the computer program product is a product provided with a computer-readable medium having computer program logic encoded thereon.

When executed on a computing device, the computer program logic provides related operations to implement the above technical solutions of the present invention. When executed on at least one processor of a computing system, the computer program logic causes the processor to perform the operations (methods) described in the embodiments of the present invention. Such setting of the present invention is typically provided as software, codes and/or other data structures provided or encoded on the computer readable medium, e.g., an optical medium (e.g., compact disc read-only memory (CD-ROM)), a flexible disk or a hard disk and the like, or other media such as firmware or micro codes on one or more read-only memory (ROM) or random access memory (RAM) or programmable read-only memory (PROM) chips, or a downloadable software image, a shared database and the like in one or more modules. Software or firmware or such configuration may be installed on a computing device such that one or more processors in the computing device perform the technical solutions described in the embodiments of the present invention.

In addition, each functional module or each feature of the base station device and the terminal device used in each of the above embodiments may be implemented or executed by a circuit, which is usually one or more integrated circuits. Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit.

Furthermore, when advanced technology capable of replacing current integrated circuits emerges due to advances in semiconductor technology, the present invention can also use integrated circuits obtained using this advanced technology.

While the present invention has been illustrated in combination with the preferred embodiments of the present invention, it will be understood by those skilled in the art that various modifications, substitutions, and alterations may be made to the present invention without departing from the spirit and scope of the present invention. Therefore, the present invention should not be limited by the above-described embodiments, but should be defined by the appended claims and their equivalents.

The invention claimed is:
1. A method performed by user equipment, comprising:
  determining a physical sidelink feedback channel (PSFCH) with a number of 2 Orthogonal Frequency

Division Multiplexing (OFDM) symbols in a slot, wherein, a symbol number of the second OFDM symbol, $l_2^{PSFCH}$, is defined as $$l_2^{PSFCH} = l_{start}^{SL} + N_{length}^{SL} - 2$$

wherein
  $l_{start}^{SL}$ is a symbol number of a first OFDM symbol used for sidelink in the slot, and
  $N_{length}^{SL}$ is the number of OFDM symbols used for sidelink in the slot; and
transmitting the PSFCH.

2. User equipment, comprising:
a processor; and
a memory, storing instructions, wherein, on the basis of the instructions, the processor is configured to:
determine a physical sidelink feedback channel (PSFCH) with a number of 2 Orthogonal Frequency Division Multiplexing (OFDM) symbols in a slot, wherein, a symbol number of the second OFDM symbol, $l_2^{PSFCH}$, is defined as $$l_2^{PSFCH} = l_{start}^{SL} + N_{length}^{SL} - 2$$

wherein
  $l_{start}^{SL}$ is a symbol number of a first OFDM symbol used for sidelink in the slot, and
  $N_{length}^{SL}$ is the number of OFDM symbols used for sidelink in the slot; and
transmit the PSFCH.

3. The User equipment in claim 2, wherein,
  $l_{start}^{SL}$ is configured by a parameter sl-StartSymbol; and
  $N_{length}^{SL}$ is configured by a parameter sl-LengthSymbols.

4. User equipment, comprising:
a processor; and
a memory, storing instructions, wherein, on the basis of the instructions, the processor is configured to:
determine a physical sidelink feedback channel (PSFCH) with a number of 2 Orthogonal Frequency Division Multiplexing (OFDM) symbols in a slot, wherein, a symbol number of the second OFDM symbol, $l_2^{PSFCH}$, is defined as $$l_2^{PSFCH} = l_{start}^{SL} + N_{length}^{SL} - 2$$

wherein,
  $l_{start}^{SL}$ is a symbol number of a first OFDM symbol used for sidelink in the slot, and
  $N_{length}^{SL}$ is the number of OFDM symbols used for sidelink in the slot; and
receive the PSFCH.

\* \* \* \* \*